(12) United States Patent
Sinharoy

(10) Patent No.: US 6,526,503 B1
(45) Date of Patent: Feb. 25, 2003

(54) APPARATUS AND METHOD FOR ACCESSING A MEMORY DEVICE DURING SPECULATIVE INSTRUCTION BRANCHING

(75) Inventor: Balaram Sinharoy, Poughkeepsie, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/434,763

(22) Filed: Nov. 4, 1999

(51) Int. Cl.[7] ................................................. G06F 9/42
(52) U.S. Cl. ........................................ 712/242; 712/228
(58) Field of Search ............................... 712/242, 228, 712/233, 234, 239, 230

(56) References Cited

U.S. PATENT DOCUMENTS

| | | | |
|---|---|---|---|
| 5,021,993 A | * | 6/1991 | Matoba et al. ............... 712/242 |
| 5,142,634 A | | 8/1992 | Fite et al. |
| 5,313,634 A | * | 5/1994 | Eickemeyer ............... 712/242 |
| 5,574,871 A | | 11/1996 | Hoyt et al. |

OTHER PUBLICATIONS

Stephan Jourdan et al., "Recovery Requirements of Branch Prediction Storage Structures in the Presence of Mispredicted–Path Execution," *International Journal of Parallel Programming*, vol. 25, No. 5 1997, p. 363–383.

* cited by examiner

*Primary Examiner*—Richard L. Ellis
*Assistant Examiner*—Tonia Meonske
(74) *Attorney, Agent, or Firm*—Barry S. Newberger; Winstead Sechrest & Minick P.C.; Mark E. McBurney

(57) ABSTRACT

Instruction branching circuitry including a plurality of logical stacks each having a plurality of entries for storing an address for accessing a corresponding instruction in a memory device. A counter generates a pointer to an entry in an active one of the logical stacks, the counter including incrementation logic incrementing a stored pointer value following a Push operation and decrementation logic decrementing the stored pointer value following a Pop operation to the active one of the logical stacks. Selector circuitry selects the active one of the logical stacks in accordance with the performance of the Push and Pop operations.

20 Claims, 11 Drawing Sheets

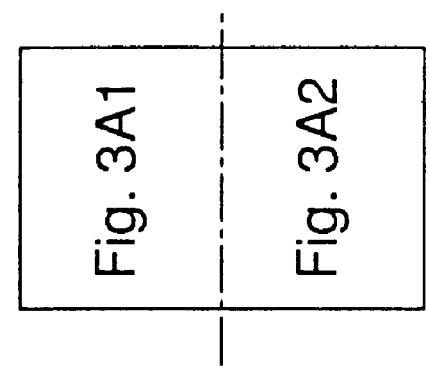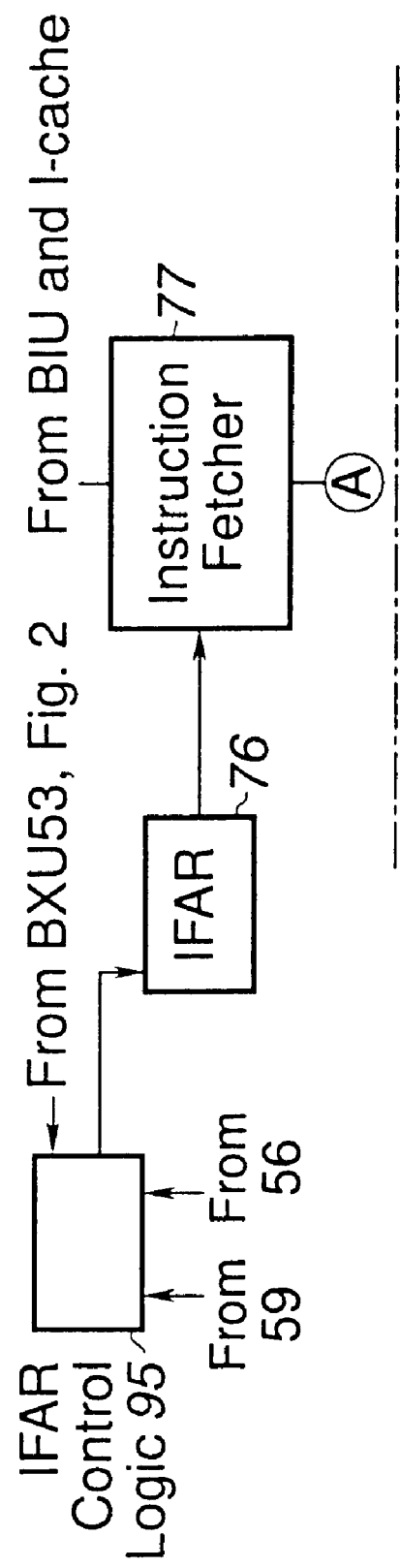
Fig. 3A1

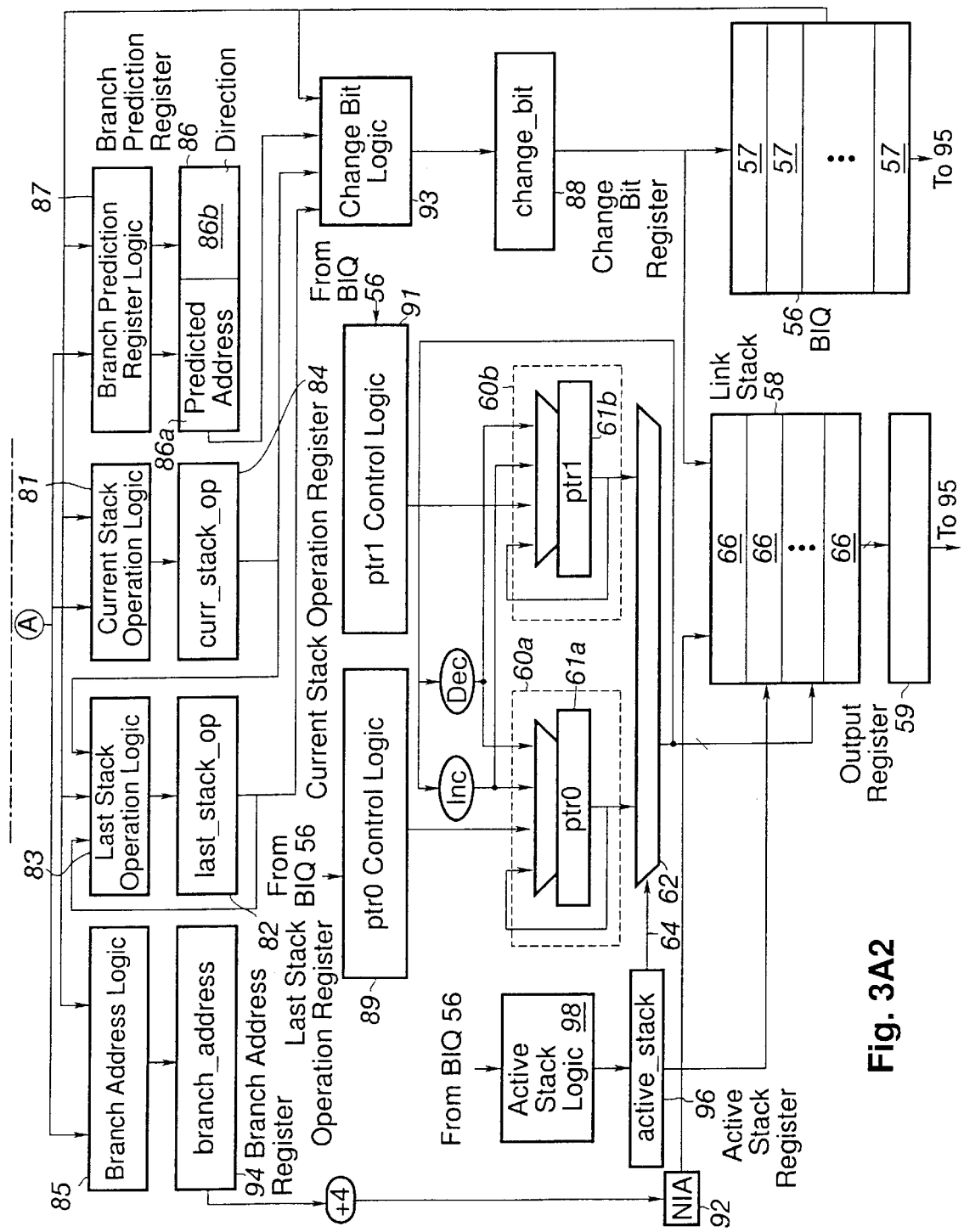
Fig. 3A2

APPARATUS AND METHOD FOR ACCESSING A MEMORY DEVICE DURING SPECULATIVE INSTRUCTION BRANCHING

CROSS-REFERENCE TO RELATED APPLICATION

The present invention is related to the following U.S. Patent Applications filed concurrently herewith and hereby incorporated herein by reference:

Ser. No. 09/435,070, entitled "Circuits, Systems and Methods for Performing Branch Predictions by Selectively Accessing Bimodal and Fetch-Based Branch History Tables"; and Ser. No. 09/434,856, entitled "Apparatus and Method for Controlling Link Sack Corruption During Speculative Instruction Branching."

TECHNICAL FIELD

The present invention relates generally to information processing, and in particular to an apparatus and method for controlling link stack corruption during branching.

BACKGROUND INFORMATION

Modern high frequency microprocessors are typically deeply pipelined devices. For efficient instruction execution in such processors, instructions are often fetched and executed speculatively. An instruction may be fetched many cycles before it is executed. Since branch instructions may cause instruction fetching to start from a non-sequential location, the direction and target of a branch instruction is predicted when the branch is fetched so that instruction fetching can proceed from the most likely address. The prediction is compared with the actual direction and target of the branch instruction when the instruction is executed. If it is determined that the branch has been mispredicted (either its target or its direction), then the branch instruction is completed and all instructions fetched after the branch are flushed out of the instruction pipeline and new instructions are fetched either from the sequential path of the branch (if the branch is resolved as not taken) or from the target path of the branch (if the branch is resolved as taken).

Often there are a number of branches (i.e., subroutine calls and returns) between the instructions that are being fetched and the instructions that are being executed in the processor execution units. Therefore, to handle subroutine calls and returns efficiently, many high frequency microprocessors employ a link stack. On a subroutine call, the address of the following instruction is "pushed" into the stack while on a subroutine return, the contents at the top of the stack (which is expected to contain the address of the instruction following the original subroutine call) are "popped" from the stack. Since pushing and popping from a hardware stack can normally be done when the branch is fetched, which is several cycles before the corresponding branches are executed in a deeply pipelined processor, such a linked stack mechanism helps implement the instruction fetching scheme across subroutine calls and returns to a great extent. Notwithstanding, the link stack can become corrupted during the process of speculative instruction fetching and execution.

Consider, for example, the case where a subroutine call is performed using a "branch and link instruction" and a return from subroutine is achieved using a "branch to link register" or "bclr" instruction. It may happen that a "bclr" instruction, which for example returns to a location "A", is fetched speculatively followed by a speculative fetch of a "branch and link" instruction, for example from call-site B. The link stack is updated at fetch time, such that after these instructions are fetched, the address location "A" is replaced by the address location "B+4" (each instruction consists of four bytes) at the top of the link stack. Since both the "bclr" and "branch and link" instructions are speculatively fetched, they may not ultimately be in the actual execution path. If these instructions are not in fact in the actual execution path, (in which case the instructions are flushed out), the link stack becomes corrupted.

Generally, any time one or more "bclr" instructions are followed by one or more "branch and link" instructions in the speculated path, the link stack becomes corrupted if the speculation turns out to be wrong. For a commercial programming workload, about 2% of the instructions are "bclr" instructions and therefore it becomes very important to be able to predict the target address for these instructions with a good degree of accuracy in deeply pipelined machines. Thus, the need has arisen for circuits, systems and methods to control link stack corruption, as well as to recover a link stack from corrupted condition.

SUMMARY OF THE INVENTION

The principles of the present invention are embodied in circuits, systems and methods for executing branch instructions. In accordance to one embodiment of these principles, instruction branching circuitry is disclosed which includes a plurality of logical stacks each having a plurality of entries for storing an address to a corresponding instruction in memory. A counter generates a pointer to an entry of an active one of the logical stacks, the counter including incrementation logic incrementing a stored pointer value following a Push operation and decrementation logic decrementing the stored pointer value following a Pop operation to the active logical stacks. Selector circuitry selects the active one of the logical stacks in accordance with the performance of the Push and Pop operations.

According to one specific embodiment of the inventive principles, the selector circuitry changes the active stack from a first stack to a second stack in response to a Pop operation followed by an instruction for a Push operation, the Push operation then performed to the second stack. In a second particular embodiment, the selector circuitry changes the active stack in response to the state of a bit associated with information popped from the active stack during a Pop operation.

The principles of the present invention provide substantial advantages over the prior art. Among other things, circuitry and methods are provided which allow for the control of link stack corruption. In particular, the present inventive principles allow for the construction and operation of a register file of m-logically separate stacks which allows recovery of m−1 number of redirections caused by misspeculation during the execution of branching instructions.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which:

FIG. 3A is a logical diagram illustrating the principles of the present invention;

DETAILED DESCRIPTION

Figure 1:
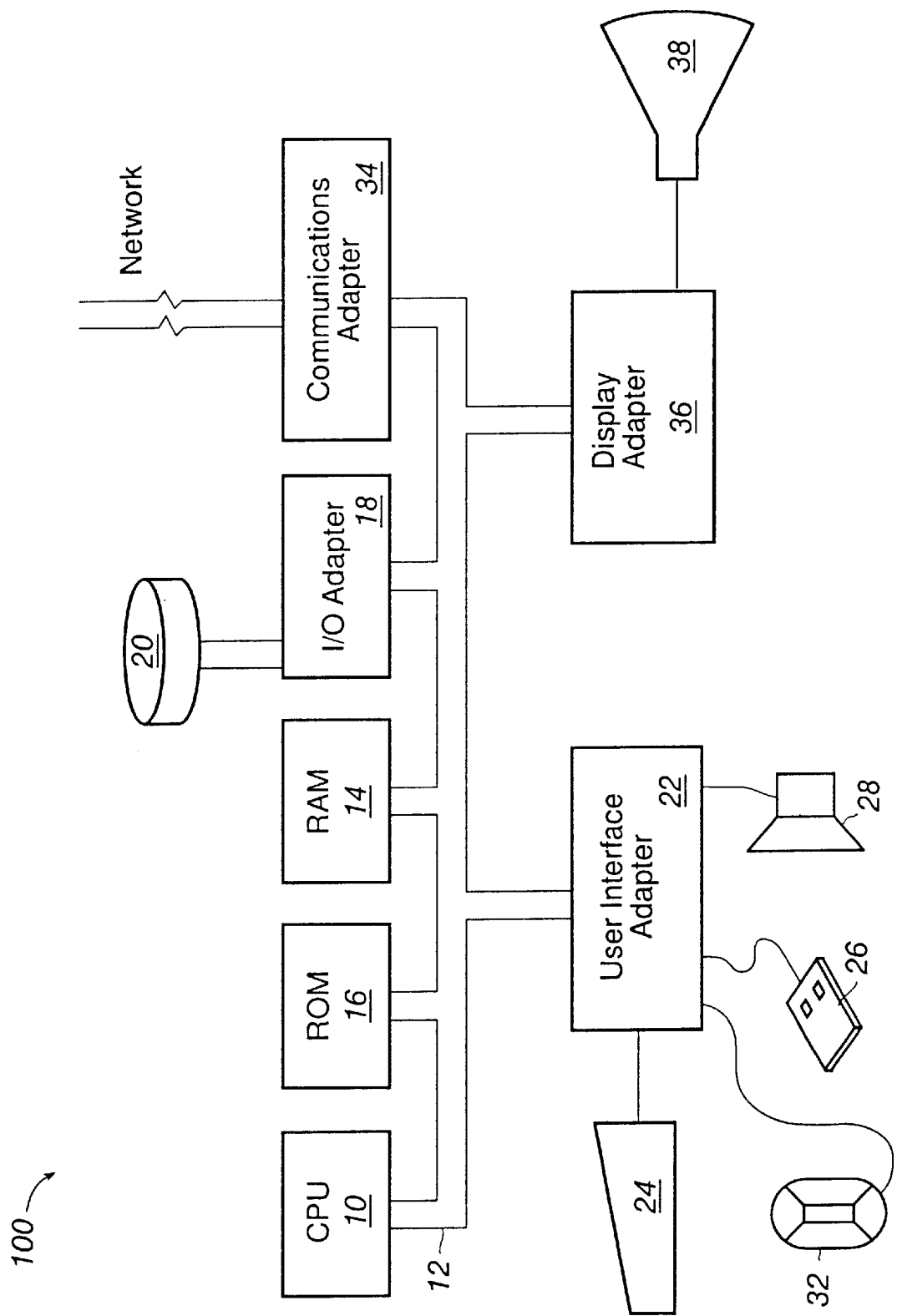
FIG. 1 is a high level functional block diagram of a representative data processing system suitable for practicing the principles of the present invention.

In the following description, numerous specific details are set forth to provide a thorough understanding of the present invention. It should be noted, however, that those skilled in the art are capable of practicing the present invention without such specific details. In other instances, well-known circuits have been shown in block diagram form in order not to obscure the present invention in unnecessary detail.

All such variations are intended to be included within the scope of the present invention. It will be recognized that, in the drawings, only those signal lines and processor blocks necessary for the operation of the present invention are shown.

Referring to the drawings, depicted elements are not necessarily shown to scale, and like or similar elements are designated by the same reference numeral through the several views.

Referring to FIG. 1 there is illustrated a high level functional block diagram of a representative data processing system 100 suitable for practicing the principles of the present invention. Processing system 100, includes a central processing system (CPU) 10 operating in conjunction with a system bus 12. CPU 10 may be for example, a reduced instruction set computer (RISC), or a complex instruction set computer (CISC). System bus 12 operates in accordance with a standard bus protocol, such as the ISA protocol, compatible with CPU 10.

CPU 10 operates in conjunction with read-only memory (ROM) 16 and random access memory (RAM) 14. Among other things, ROM 16 supports the basic input output system (BIOS). RAM 14 includes for example, DRAM (Dynamic Random Access Memory) system memory and SRAM (Static Random Access Memory) external cache.

I/O adapter 18 allows for an interconnection between the devices on system bus 12 and external peripherals, such as mass storage devices (e.g., a hard drive, floppy drive or CD/ROM drive), or a printer. A peripheral device 20 is for example, coupled to a peripheral control interface (PCI) bus, and I/O adapter 18 therefore may be for example a PCI bus bridge.

User interface adapter 22 couples various user input devices, such as keyboard 24, mouse 26, touchpad 32 or speaker 28 to the processing devices on bus 12.

Display adapter 36 supports a display 38 which may be, for example, a cathode ray tube (CRT), liquid crystal display (LCD) or similar conventional display unit. Display adapter 36 may include among other things a conventional display controller and frame buffer memory.

System 100 can be selectively coupled to a computer or telecommunications network through communications adapter 34. Communications adapter 34 may include for example, a modem for connection to a telecommunications network and/or hardware and software for connecting to a computer network such as a local area network (LAN) or wide area network (WAN).

Figure 2:
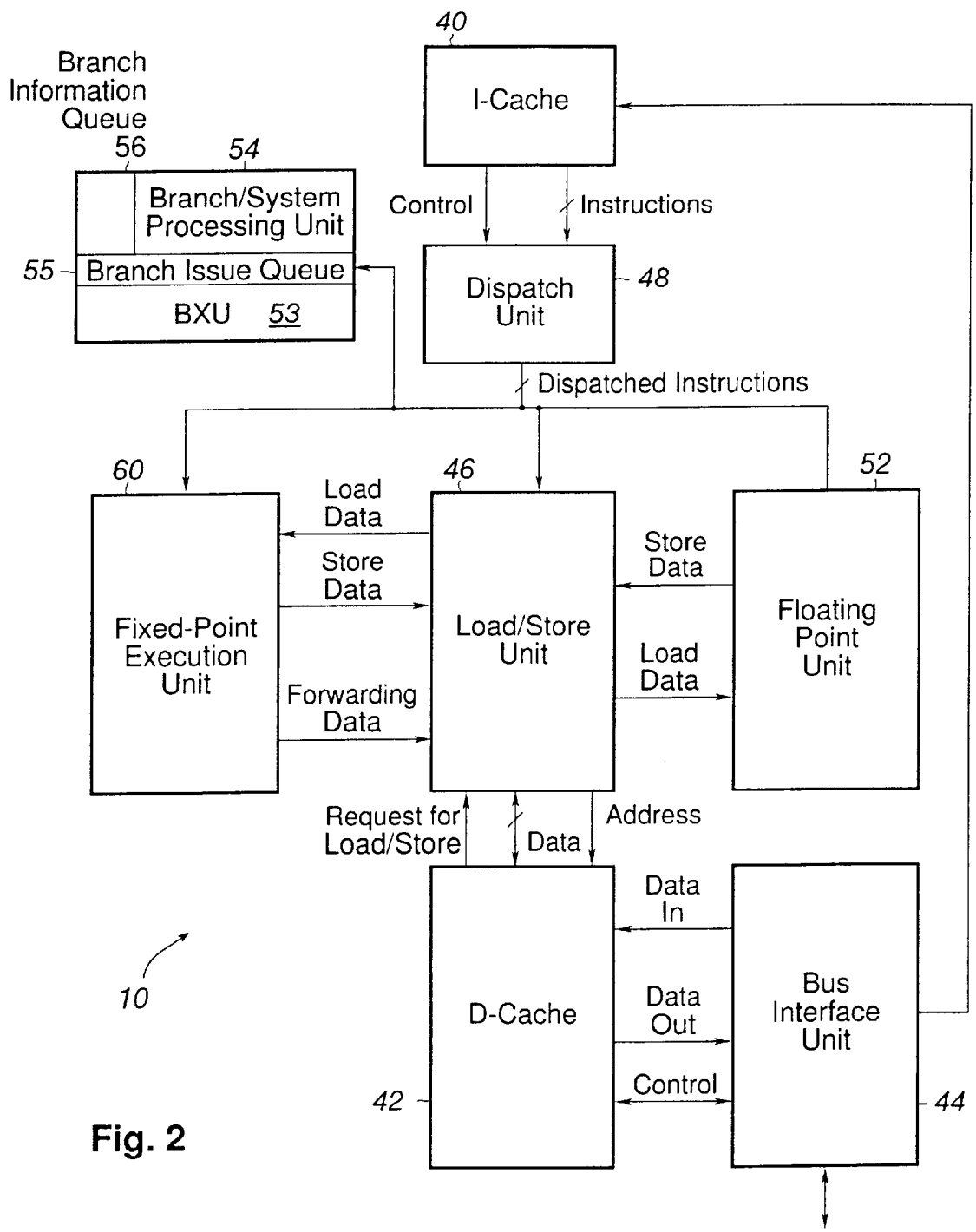
FIG. 2 is a high level functional block diagram of selected operational blocks within a CPU.

FIG. 2 is a high level functional block diagram of selected operational blocks within CPU 10. In the illustrated embodiment, CPU 10 includes internal instruction cache (I-cache) 40 and data cache (D-cache) 42 which are accessible through bus 12 and bus interface unit 44 and load/store unit 46. In the depicted architecture, CPU 10 operates on data in response to instructions retrieved from I-cache 40 through instruction dispatch unit 48. In response to dispatched instructions, data retrieved from D-cache 42 by load/store unit 46 can be operated upon using either fixed point execution unit 50 or floating point execution unit 52. Instruction branching is controlled by branch/system processing unit 54.

Branch/system processing unit 54 includes branch execution unit (BXU) 53 for executing branch instructions. Branch instructions are queued for execution in branch issue queue 55. Branch/system processing unit 54 also maintains a branch information queue (BIQ structure) 56 for each branch that has been fetched and dispatched from dispatch unit 48, after being decoded. The BIQ structure contains all the necessary information for each branch in the pipeline. BIQ 56 will be described in further detail. FIG. 3A is a logical diagram illustrating the principles of the present invention. According to these principles, a re-named link stack approach is used which can be described as follows. One stack of size m*n is defined where "m−1" is the number of redirections that can be recovered on a misspeculation event. A "redirection" will be defined as a sequence of a Pop followed by a Push. Although it physically is only a single register file 58, m number of logically separate stacks are maintained, with the logical stack changing every time there is a change of direction (i.e., one or more pops followed by one or more pushes, or if a change bit in the link stack has been set). Each of the m logically separate stacks is associated with a separate pointer, although only one of the stacks is active at a given time. In FIG. 3A, link stack 58 is shown as 2x8 entry stack wherein m=2).

In the embodiment shown in FIG. 3A, the present principles are illustrated by assuming that there are two logical stacks (i.e., m=2) and therefore there are two corresponding counters 60a and 60b. Each counter 60 includes incrementation (Inc.) and decrementation (Dec.) logic along with a register lower stack_ptr or upper stack_ptr. In this example, the first (lower) counter value always ranges between 0 and 7, and the second (upper) counter always ranges between 8 and 15 (i.e., these are modulo counters, therefore, for example, if the value in the second counter is 15 and an incrementation takes place, the counter value becomes 8, and so on), wherein n, in this example, is eight. It should be noted that the present inventive principles can easily be generalized to configurations including more that two stacks, which advantageously allows for recovery from m number of redirections, where m>2 and n may be any predetermined value, which determines a maximum number of consecutive branch and link instructions which may be fetched and the corresponding return addresses correctly predicted.

Consider the case where, a write (Push) occurs on a "branch and link" instruction fetch. Here, if the last operation was a read (Pop), then the active stack changes to the next logical stack, otherwise the active stack remains the same. In either case, the write is made into the active stack and the corresponding active stack pointer increments in the corresponding counter 60. After the stack operation, both the stack pointers from counters 60a and 60b (i.e., active and nonactive) are stored in the BIQ, along with information indicating which of the logical stacks is active. (The contents of the respective counters 60 will hereinafter be referred to as ptr0 and ptr1) The BIQ includes a plurality of entries. A BIQ entry 57, which may be used in an embodiment of the present invention, is shown in FIG. 3C. Entry 57 includes field 65 for holding ptr0, field 67 for holding ptr1, and field 69 for holding a data value ("active_stack") corresponding to the active stack. For discussion purposes, assume that a 0 indicates the lower logical stack is active and a 1 indicates that the higher logical stack is active. Additionally, if the active stack has changed for the write operation, then a data value ("change_bit"), which may be a one-bit indicator, is stored in the stack entry along with the return address. (This information indicates from where to Pop for the next entry once this current entry has been popped).

Figures 3B, 4:
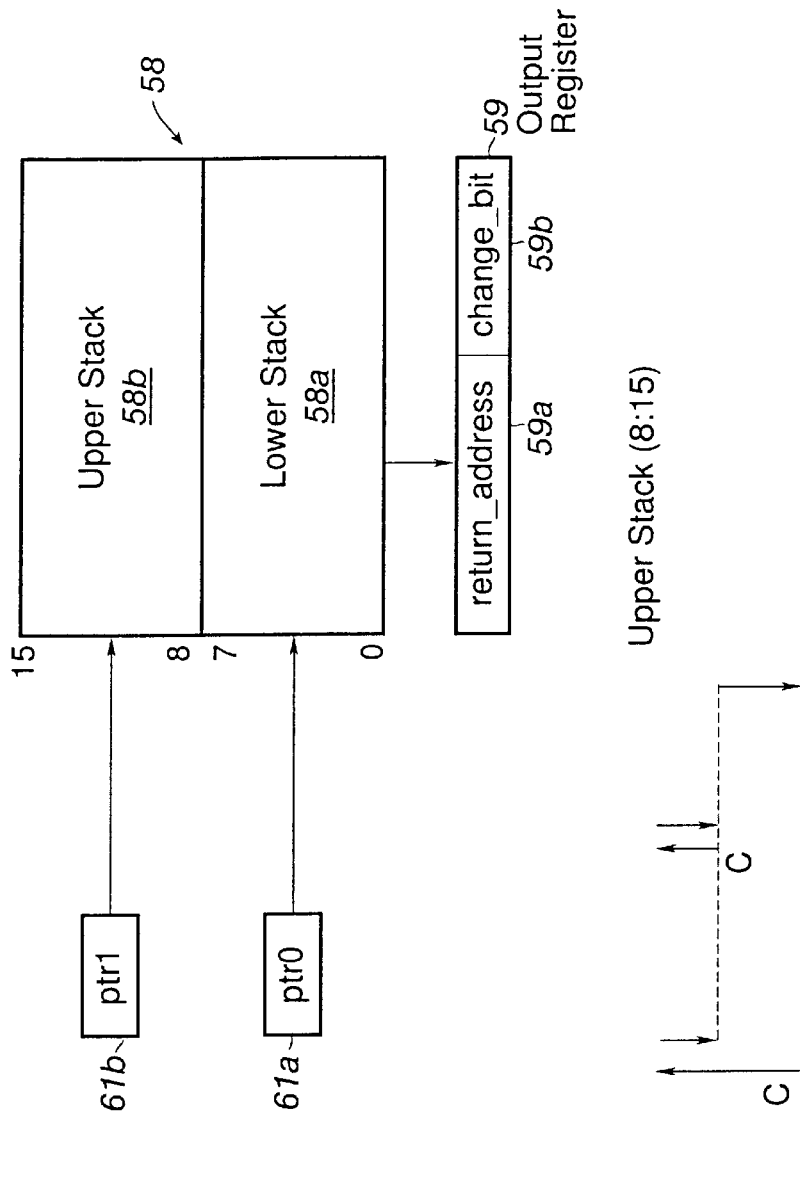
FIG. 3B illustrates a link stack in accordance with an embodiment of the present invention.
FIG. 4 graphically represents Push and Pop operations, as well as changes in the active logical stack.
Figure 3C:
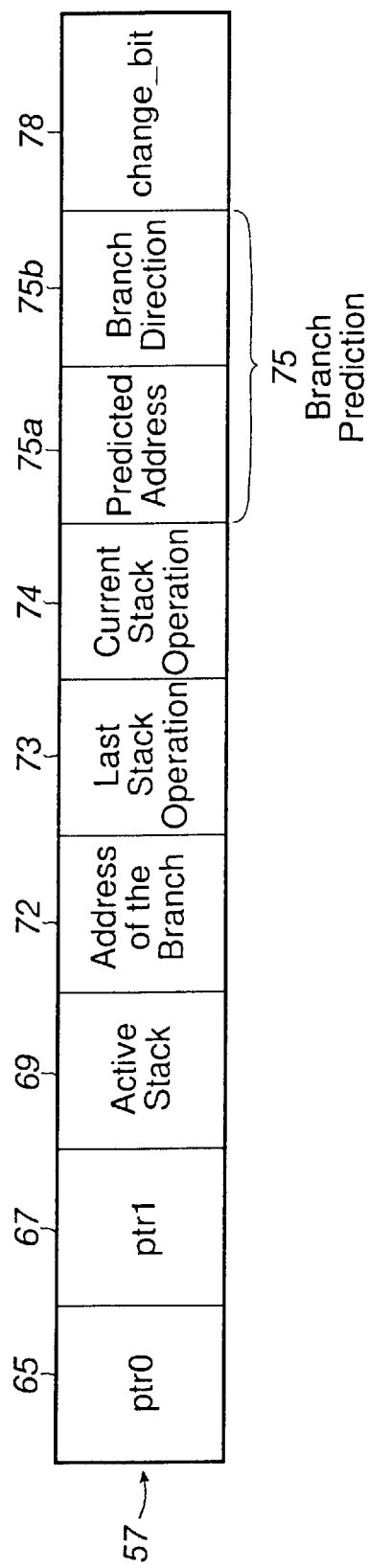
FIG. 3C schematically illustrates a branch instruction queue entry in accordance with an embodiment of the present invention.
Figure 3D:
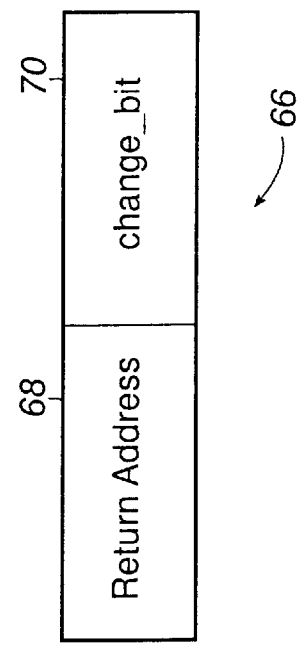
FIG. 3D schematically illustrates a link stack entry in accordance with an embodiment of the present invention.
Figure 5A:
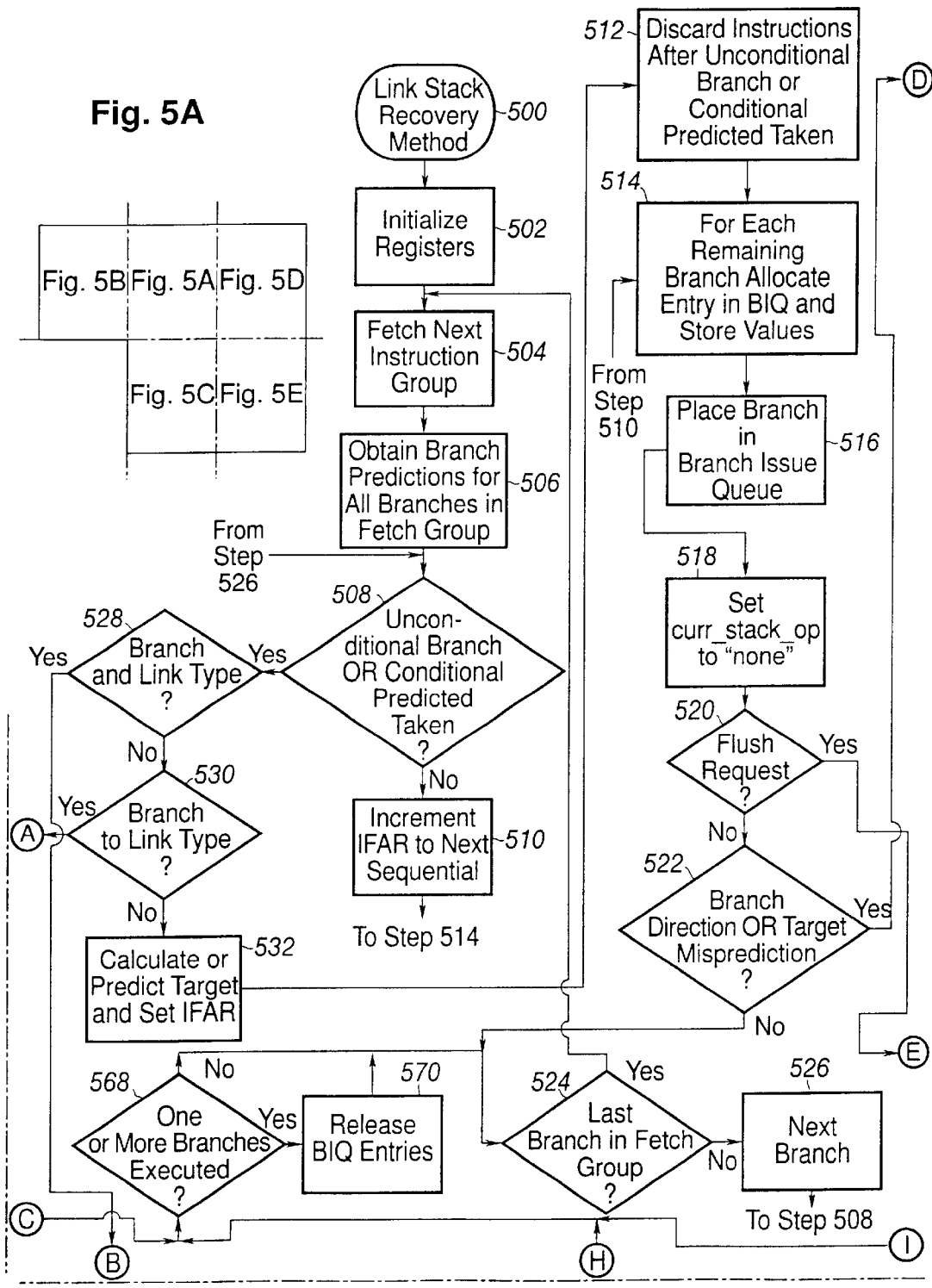
FIG. 5 illustrates, in flowchart form, a link stack methodology in accordance with an embodiment of the present invention.
Figure 5B:
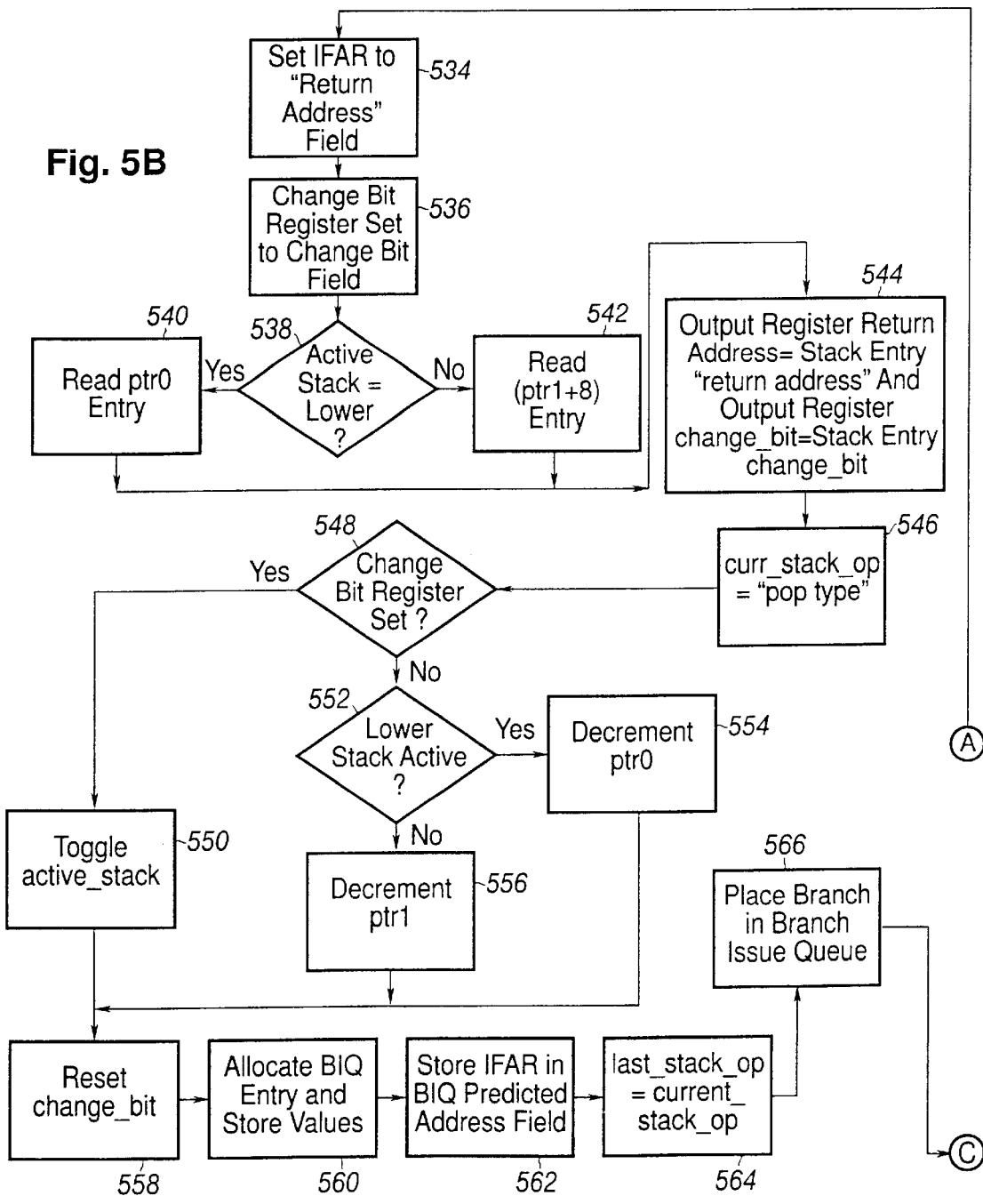
Figure 5C:
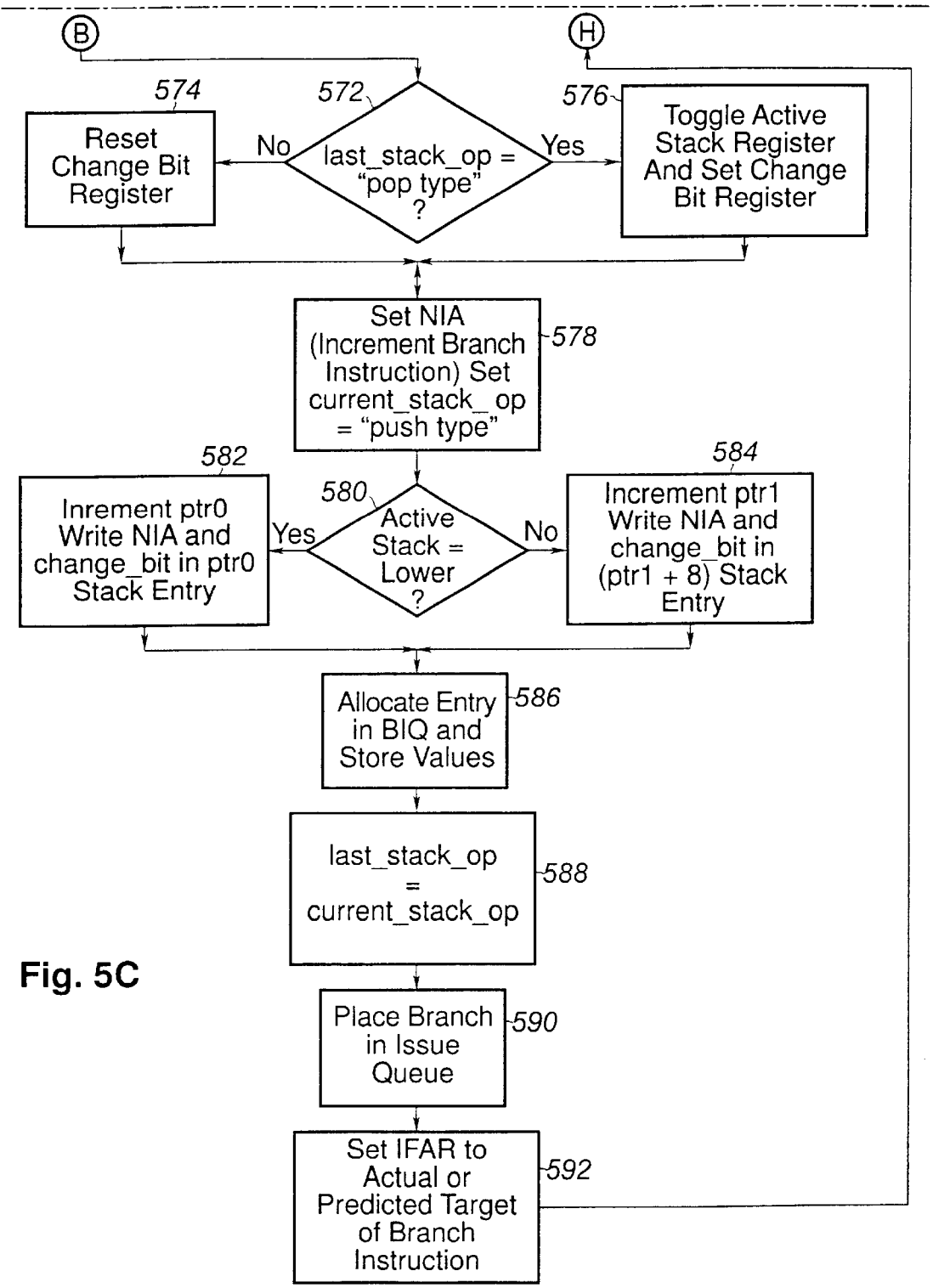
Figure 5D:
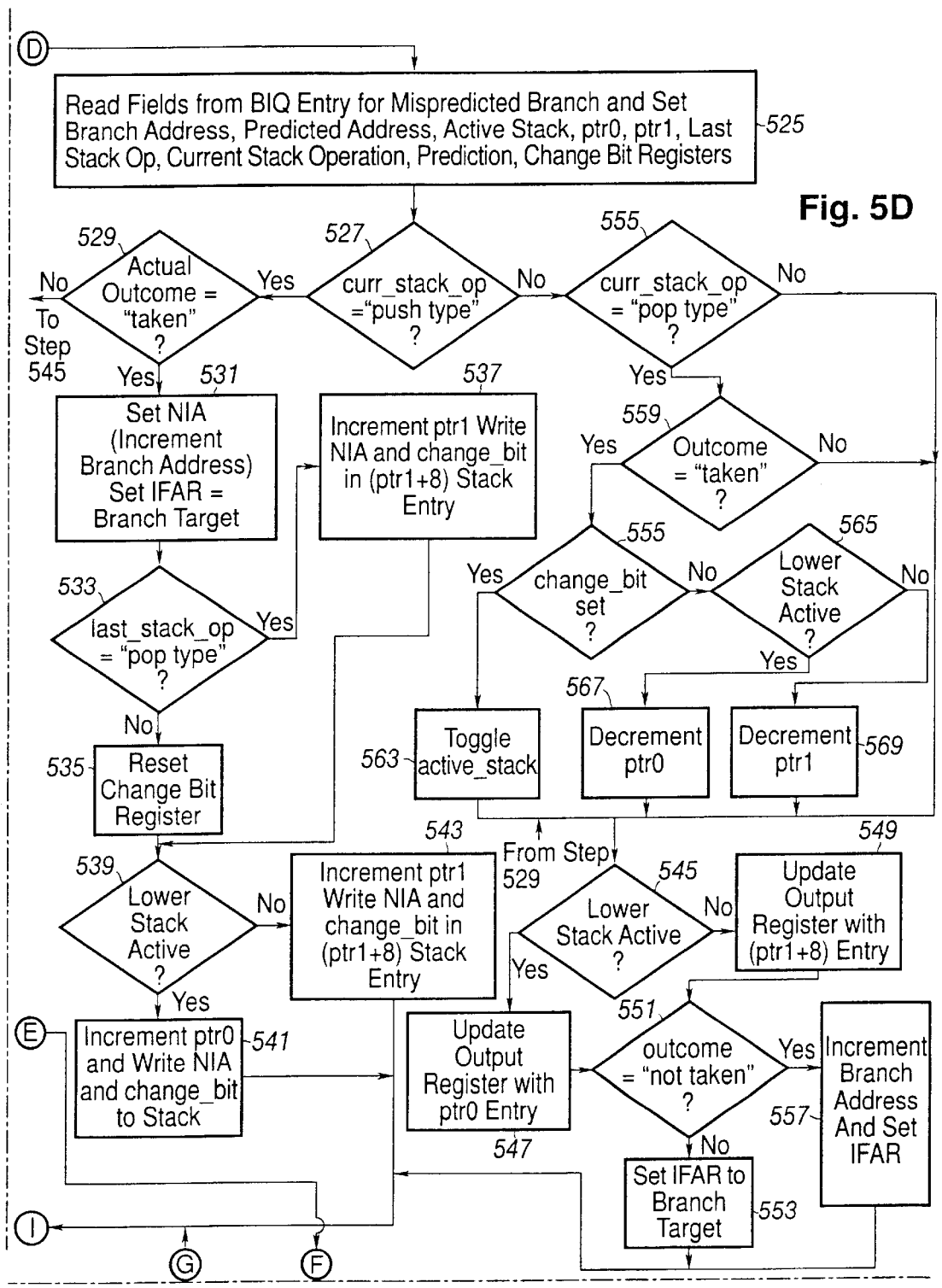
Figure 5E:
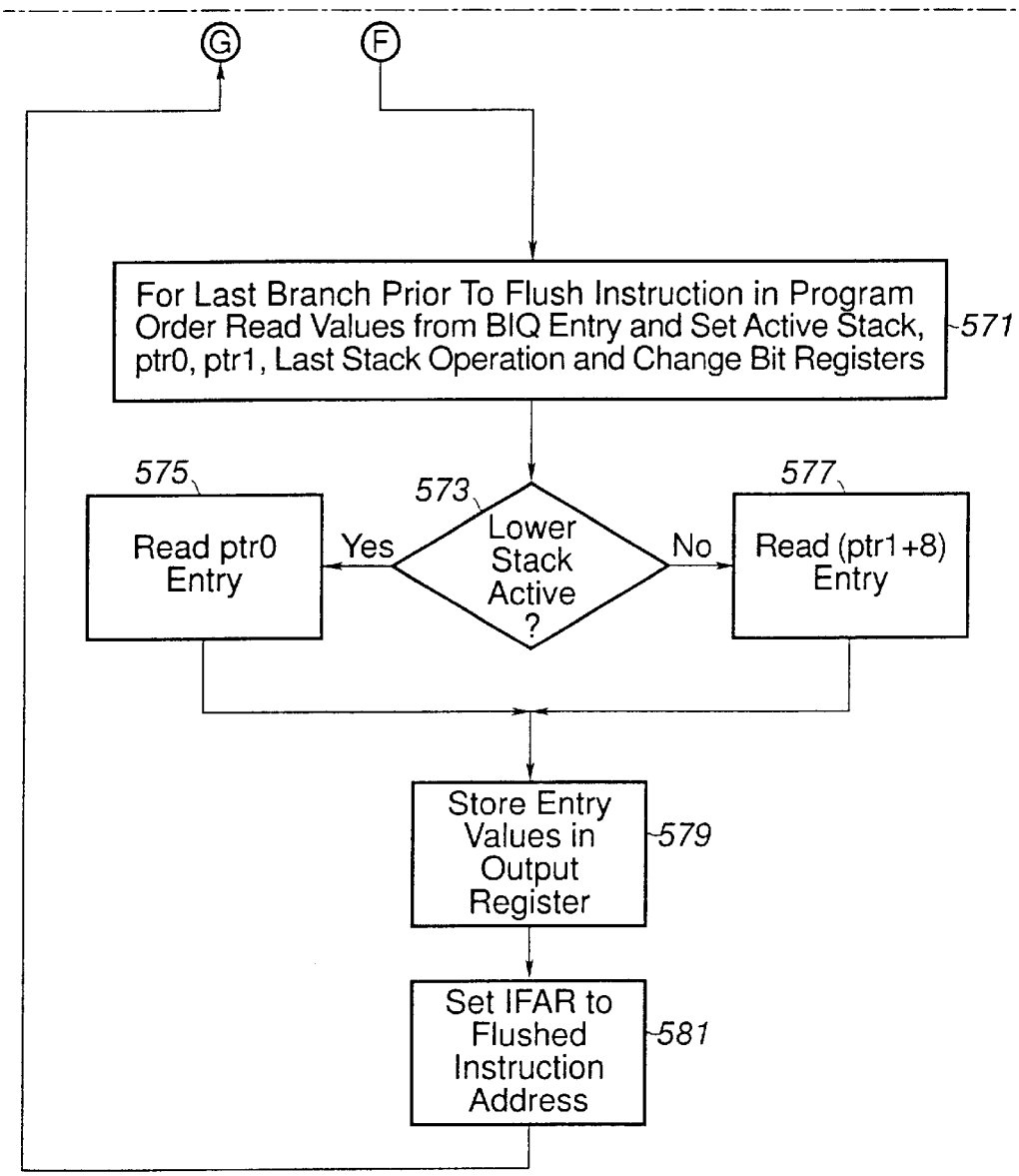

A link stack entry 66 is shown in FIG. 3D. Each entry 66 includes a return address field 68 for holding a return address and an active stack changed field 70, holding the change_bit. The value of active_stack, controls multiplexer 62 at the output of counters 60a and 60b via active_stack 64 from active stack register 96.

A read (Pop) occurs during a "bclr" instruction fetch. In this case, a read is made from the active logical stack and the pointer is decremented by the corresponding counter 60. If upon the read, it is found that the stack content also indicates that the next read should be from a different logical stack (that is the stack-selector bit has been set), the active stack is changed.

During a flush, all the pointers and the information on which one of the logical stacks is active is retrieved from the BIQ.

The algorithm embodying the present inventive principles can thus be summarized as follows. If one or more Pops is followed by a Push, then: (1). Active stack is swapped; (2). a Push is made into the active stack with its (selector) bit set, and the active stack pointer is incremented; and (3). the pointers for both the active and inactive stacks and the new stack selector bit value are written into the BIQ. For a Push followed by a Push, the Push is made into the active stack and the active stack pointer is incremented. During a Pop: (1). the Pop is made from the active stack and the active stack pointer is decremented; and (2). if the popped value has its selector bit set, the active stack is changed. Again, during a flush, the pointers to the active and inactive stacks are retrieved from the BIQ and loaded into counters 60a and 60b, and the active stack selected using the active stack value.

FIG. 4 schematically illustrates a sequence of exemplary Push (up arrows) and Pop (down arrows) operations. The occurrences of changes in the active logical stack, in accordance with the algorithm described above are denoted by the letter "C."

An exemplary series of operations are provided in Table 1. Again, for discussion purposes, a configuration with two logical stacks (i.e., m=2) is being assumed with each stack having eight entries. For this configuration, a register file 58 therefore has a total of sixteen entries. The sequence in Table 1, from top to bottom proceeds from earlier actions to later actions.

Consider first the case where a flush up to action 7 takes place (i.e., the instructions corresponding to entries 8–10 are the results of misspeculation and are being flushed). Here, the information [1, 9, 1] is retrieved from the BIQ. Counter 1 is therefore set to 1, counter 2 is set to 9 and the second logical stack becomes the active stack. Hence, the active stack contains the addresses [A, B, D, E], which should have been the stack content, if no instructions after the seventh stack operation were executed.

Now consider a flush up to action 4. In this case, the information retrieved from the BIQ is [2, 15, 0]. In this case counter 1 holds a count of 2, counter 2 a count of 15 and logical stack 0 is the active stack. In this case, the stack contains [A, B, C] which is again the expected stack content assuming that the stack operations halted after the fourth stack operation.

Next however, assume that an eleventh stack operation is performed after the tenth operation, and this eleventh operation is a Push F. The additional entry for Table 1 is shown in Table 2. In this case, if the flush up to action 7 and flush up to action 4 operations are performed, the stack cannot be recovered for the exemplary two-stack embodiment, since more than two re-directions take place.

In the case of a flush up to action 7 operation, the information [1, 9, 1] is retrieved from the BIQ. This means that the stack contains [A, B, F, E] instead of the proper [A, B, D, E] and therefore the stack is partially corrupted. For a flush up to action 4 operation the information [2, 15, 0] is retrieved from the BIQ. In this case, the stack contains [A, B, C], which is correct.

The limitations of link stack recovery can be summarized as follows.

1. bl
   bclr (i times)
   bi (j times)
   bclr (k times) k<=j
   bl
   with m logical stacks, the subsequence
   bl (j times)
   bclr (k times) k<=j
   above can be repeated (m−1) times before the corruption becomes irrecoverable.
2. bl (i times)
   bclr (i times)
   bclr
   bl
   With m logical stacks, the subsequence
   bl (i times)
   bclr (i times)
   above can be repeated (m−1) times before the corruption becomes irrecoverable.

TABLE 1

| | Counters After Operation | | Active | |
|---|---|---|---|---|
| Action | Counter 1 | Counter 2 | Stack | Comments |
| 1. Hold | 7 | 15 | 0 | Initial counter values and active stack. |
| 2. Push A | 0 | 15 | 0 | BIQ [0, 15, 0] |
| 3. Push B | 1 | 15 | 0 | BIQ [1, 15, 0] |
| 4. Push C | 2 | 15 | 0 | BIQ: [2, 15, 0] |
| 5. Pop (C) | 1 | 15 | 0 | BIQ: [1, 15, 0] |
| 6. Push D | 1 | 8 | 1 | Last operation was Pop, |

TABLE 1-continued

| | Counters After Operation | | Active | |
|---|---|---|---|---|
| Action | Counter 1 | Counter 2 | Stack | Comments |
| | | | | so the active stack changes. Set the change bit in the stack entry for D. BIQ: [1, 8, 1] |
| 7. Push E | 1 | 9 | 1 | BIQ: [1, 9, 1] |
| 8. Pop (E) | 1 | 8 | 1 | BIQ: [1, 8, 1] |
| 9 Pop (D) | 1 | 15 | 0 | Since the change bit was set, change the active stack. BIQ: [1, 15, 0] |
| 10. Pop (B) | 0 | 15 | 0 | BIQ: [0, 15, 0] |

TABLE 2

| | Counters After Operation | | Active | |
|---|---|---|---|---|
| Action | Counter 1 | Counter 2 | Stack | Comments |
| 11. Push F | 0 | 8 | 1 | Last operation was Pop, so the active stack changes. Set change bit in the stack entry for F. BIQ: [0, 8, 1] |

Refer now to FIG. 5 illustrating, in flow chart form, link stack recovery process 500. In step 502, process 500 begins by initializing in the link stack apparatus, for example, the link stack apparatus illustrated in FIG. 3A. The first instruction in the program being executed is stored in the instruction fetch address register (IFAR) 76. Instruction addresses in the IFAR are provided to instruction fetcher 77 which accesses instructions cached in the I-cache or, if not in the I-cache, from higher levels of memory. Each of pointer logic 60a and 60b include a corresponding pointer register, ptr0 register 61a and ptr1 register 61b. Each of these registers is initialized with the value "0". Additionally, active stack register 96 is initialized with the value "0". In an embodiment of the present invention, the initial values represent a selected initial set of values in a link stack, and an initial selected active logical stack. It would be understood by an artisan of ordinary skill that the present invention does not require a particular choice of the initial values and alternative embodiments having different selected initial conditions would be within the spirit and scope of the present invention.

In step 504, a next instruction group is fetched. A fetched instruction group will hereinafter be referred to as an "fetch group." A fetch group may include from one to eight instructions in an embodiment of the present invention in which instructions are four bytes long and instructions are fetched up to, but not including, a byte with an address that is a multiple of thirty-two. It would be understood by an artisan of ordinary skill in the art that in alternative implementations in which instruction lengths include other numbers of bytes, or in which other fetch schemes are implemented, that the number of instructions in a fetch group may be different. It would be further understood by an artisan of ordinary skill that such alternative embodiments would also be within the spirit and scope of the present invention.

For the fetch group fetched in step 504, branch predictions are obtained for all branches in the fetch group, if any.

Branch predictions may be obtained, in step 506, in accordance with the co-pending, commonly-owned U.S. Patent Application entitled, "Circuits, Systems and Methods for Performing Branch Predictions by Selectively Accessing Bimodal and Fetched-Based Branch History Tables," which has hereinabove been incorporated by reference. However, an artisan of ordinary skill in the art would recognize that other branch prediction mechanisms may also be used in the present invention, and alternative embodiments thereof incorporating such other branch prediction mechanisms would be within the spirit and scope of the present invention.

Methodology 500 then loops over all of the branches in the fetch group and determines their effect on the link stack, such as link stack 58 in FIG. 3A. In step 508, it is determined if the branch is an unconditional branch or a conditional branch predicted taken. If, in step 508, the branch is not an unconditional branch and is not a conditional branch predicted taken, then methodology 500 proceeds by the "No" branch of step 508, and in step 510 increments the IFAR to the next sequential address. Process 500 then proceeds to step 514, bypassing step 512. (Step 512, discussed below, is bypassed, because the "No" branch in step 508 has been taken, and there are no instructions to be flushed.) In step 514, for each remaining branch, an entry is allocated in the BIQ, such as entry 57 in BIQ 56, FIG. 3B. The address of the branch, the value in the active stack register 96, ptr0 register 61a, ptr1 register 61b, from last stack operation register 82, current stack operation register 84, the branch target address and branch prediction from branch prediction register 86, and change bit register 88 are entered in the respective fields in the field in the entry 57 in BIQ 56 allocated in step 514, for example, fields 65, 67, 69, 72, 73, 74, 75a, 75b, 78, FIG. 3C. In step 516, the branch is placed in the branch issue queue, such as branch issue queue 55, FIG. 2, for eventual execution by a branch execution unit such as BXU 54, FIG. 2.

In step 518, the value in current stack operation register 84 is set to "none". In an embodiment of the present invention, the data value representing the current stack operation ("curr_stack_op") and the data value representing the last stack operation ("last_stack_op") may be represented by two-bit values. For example, the value "none" may be represented by "00", a push-type operation may be represented by "10" and a pop-type operation may be represented by "01". However, it would be understood by an artisan of ordinary skill in the art that other, predetermined values may be used to represent these stack operation types.

In step 520, it is determined if a flush request is received. A flush request is generated by the processor when an event occurs that requires instructions be flushed from the machine. Such flush events may occur for a variety of reasons other than branch mispredictions, discussed below. For example, modern processors implement instructions that load multiple words at a time from memory. An instruction loading four words ("quad" word instruction) is an atomic instruction loading 128 bits, in an implementation having thirty-two bit words. Typically, this instruction is internally implemented as two double-word loads from two successive double-words in memory. In a multiprocessor system, a second processor may store a value into the second double-word before it has been loaded by the first processor. In such a case, the first processor, snooping the bus, will observe a snoop event, and will generate a flush request causing the quad word load along with all the successive operations to be flushed out of the first processor. An artisan of ordinary skill would recognize, however, that other operations may also give rise to flush events. If, in step 520, a flush request has been received, then method 500 proceeds by steps 571–581 to recover the link stack. Steps 571–581 will be discussed hereinbelow.

If, however, a flush request is not received in step 520, in step 522, it is determined if a branch direction or target misprediction has occurred. If so, the methodology 500 executes steps 525–551 to recover the link stack. Steps 525–557 will subsequently be described in further detail. Otherwise, in step 524, it is determined if a last branch instruction in the current fetch group has been processed. If so, methodology 500 returns to step 504. Otherwise, the next branch, step 526, is processed by returning to step 508.

Returning now to step 508, if the branch instruction in the fetch group being processed is an unconditional branch or a conditional branch predicted, in step 506, to be taken, it is determined in step 528 if the branch instruction is a branch and link-type instruction. If so, methodology 500 recovers the link stack in accordance with steps 572–592. These steps will be discussed further below. If, however, in step 528, the instruction is not a branch and link-type instruction, then in step 530, it is determined if the instruction is a branch-to-link-type instruction. If the instruction is not a branch-to-link-type instruction, in step 532, the IFAR is set. The address set in the IFAR is the target address of the branch, which, depending on the specific branch instruction, may either be predicted or calculated. For example, if the instruction is a relative branch, the target address may be calculated by adding the branch target operand to the current instruction address. Similarly, an absolute branch instruction branches to the absolute address represented by the target operand. On the other hand, the branch may be conditional, in which instance, the target address is the predicted address from step 506. Methodology 500 then continues to step 512. In step 512, all instructions after an unconditional branch or a conditional branch predicted taken, if any, are discarded, and methodology 500 continues with step 514, previously discussed.

If, the instruction is a branch-to-link-type instruction, in step 530, then methodology 500 proceeds to step 534–566 to perform the link stack operations associated with the corresponding Pop operation.

In step 534, the IFAR is set to the data value ("return_address") representing the return address following the branch operation in field 59a of output register 59, FIG. 3B. Additionally, change bit register 88, FIG. 3A, is set to the value of the change_bit in field 59b of output register 59, FIG. 3B, step 536. Change bit register 88 may be set by change_bit logic 93 in an embodiment of the present invention according to the apparatus of FIG. 3A.

In step 538, it is determined if the active stack is the lower stack, such as stack 58a in FIG. 3B. If so, the stack entry pointed to by ptr0 in ptr0 register 61a is read, step 540. Step 540 may be performed by indexing into link stack 58 via the output of multiplexer (MUX) 62 in response to active_stack 64 from active stack register 96, FIG. 3A. Otherwise, the "No" branch from step 538 is followed and the link stack entry pointed to by the value of ptr1 incremented by eight is read, step 542. Recall that in an embodiment of the present invention, the values of ptr0 and ptr1 may be generated by modulo eight counters. However, in an alternative embodiment of the present invention, as previously described, link stack 58 may have other predetermined numbers of entries, 2*n, and ptr0 and ptr1 may be generated modulo n. Step 542 may be performed via MUX 62 and active_stack 64 in similar fashion to step 540. In step 544, the value of the return_address in field 59a of output register 59 is set to the corresponding value in the stack and pointed to by one of the pointers from step 540 or 542, depending on the branch followed in step 538. Similarly, the value of the change_bit in field 59b of output register 59 is set to the corresponding value in the aforesaid stack entry. Additionally, in step 546, the value of curr_stack_op, in register 84, is set to "pop type" operation using the corresponding predetermined value which may be in accordance with those previously discussed above in conjunction with step 518. The value of curr_stack_op in register 84 may be set by current stack operation logic 81 in an embodiment of the present invention in accordance with the apparatus of FIG. 3A.

In step 548, it is determined if the value of change_bit in change_bit register 88 is set to a first predetermined value. The first predetermined value indicates that the active stack is to be changed, as previously discussed. If the active stack is to remain the current active stack, the value of change_bit in change bit register 88 is reset to a second predetermined value. For example, the first predetermined value may be a logical "1" and the second predetermined value may be logical "0", however, an artisan of ordinary skill in the art would understand that other predetermined values may be used in alternative embodiments, and such embodiments would be within the spirit and scope of the present invention. If, in step 548, it is determined that the value in the change bit register 88 is set, then the active stack is toggled, step 550. The active stack is toggled, or switched, in step 550. In an embodiment in which there are two active stacks, then the active stack may be changed by toggling the value of active_stack in active stack register 96. For example, in such an embodiment in which active stack register 96 includes a single bit, the active stack may be changed by complementing the value of active_stack therein. In an alternative embodiment in which stack 58 includes a plurality, m, of logical stacks, the value of active_stack may include k bits such that $2^k \geq m$. The active stack is then toggled or switched, in step 550, by cycling through the sequential values, modulo m, which active_stack may assume as represented by the k-bits of active stack register 96. The toggling of the value of active_stack in register 96 may be performed by active stack logic 98 in an embodiment of the present invention in accordance with the apparatus of FIG. 3A.

If, however, in step 548, value of change_bit in the change bit register was not set, it is then determined which of the stacks is active, in step 552. If, in step 552, the lower stack is active, the value of ptr0, in ptr0 register 61a, is decremented, step 554. Otherwise, step 552 proceeds by the "No" branch and the value of ptr1 in register 61b is decremented in step 556. The value of change_bit in change bit register 88 is reset in step 558.

In step 560, a BIQ entry is allocated for the branch instruction and the corresponding values are stored in the respective fields, such as fields 65, 67, 69, 72, 75a, 75b, 78 of BIQ entry 57, FIG. 3C. In step 562, the value of the IFAR is stored in the predicted address field, for example, field 75a in the BIQ entry allocated in step 560. On execution of the branch, the predicted address stored in the corresponding BIQ entry is compared with the actual target address to determine if a misprediction has occurred.

In step 564, the value of last_stack_op in last stack operation register 82 is set to the value of curr_$_{stack}$_op in current stack operation register 84. The value of last_stack_op may be set by last stack operation logic 83, FIG. 3A. In step 566, the branch is placed in the branch issue queue for its eventual execution by the branch execution unit.

Methodology 500 then proceeds to step 568 and determines if one or more branches have been executed by the branch execution unit. If so, the corresponding BIQ entries are released in step 570 and methodology 500 then proceeds to step 524 to determine if there are additional branches in the current fetch group, as previously described hereinabove. Otherwise, in step 568, if no branches have been executed, step 570 is bypassed and methodology 500 proceeds to step 524.

Returning to step 528, if the current branch is a branch and link-type instruction, then a push operation is performed on the link stack. Link stack recovery methodology 500 executes method steps 572–590 in response to a push operation in the stack.

In step 572, it is determined if the value of last_stack_op in register 82 represents a Pop-type operation. If not, in step 574, the value of change_bit in change bit register 88 is reset. Otherwise, in step 576, the active stack is toggled and the value of change_bit in change bit register 88 is set.

In step 578, the next instruction address is set. In an embodiment of the present invention in accordance with FIG. 3A, the next instruction address may be set in NIA register 92. The next instruction address is determined by incrementing the address of the branch instruction by a predetermined value. In an embodiment of the present invention in which instructions are four bytes long, the branch instruction is incremented by four. However, it would be understood by an artisan of ordinary skill in the art that the present invention may be used in embodiments in which instructions have byte-lengths other than four and the next instruction address would be determined by incrementing the branch instruction address accordingly. An artisan of ordinary skill would further understand that such alternative embodiments would be within the spirit and scope of the present invention. Additionally, in step 578, the value of curr_stack_op is set to the predetermined value representing an "push-type" operation as described in detail in conjunction with step 518 above.

In step 580, the active stack is determined. If the lower stack is active, the value of ptr0 is incremented in step 582. The value of the next instruction address, in NIA register 92, and the value of change_bit, in change bit register 88, is stored in the corresponding stack entry pointed to by ptr0. If, however, in step 580, the active stack is the upper stack, in step 584, the value of ptr1 is incremented, and the next instruction address and the value of change_bit is written to the stack entry pointed to by ptr1+8, in an embodiment of the present invention in which each logical stack includes eight entries as discussed above in conjunction with step 538.

In step 586, an entry in the BIQ is allocated for the current branch instruction in the fetch group and the corresponding data values are stored in the respective fields of the BIQ entry. The value of last_stack_op in last stack operation register 82 is set to the value of curr_stack_op in current stack operation register 84, step 588. The branch is placed in the branch issue queue, step 590, for eventual execution by the branch execution unit.

In step 592, the IFAR is set to the actual or predicted target of the branch instruction. The actual target or predicted target is used in accordance with the actual branch and link-type instruction being processed. As discussed hereinabove in conjunction with step 532, a set of branch instructions may have target addresses that are immediately calculable. Other branch instructions may be conditional, in which instance the target addresses may be predicted addresses. The address set in the IFAR in step 592 is determined in accordance with the branch instruction having a target address that is calculable, or the branch instruction having a target address which is conditional, and, therefore, predicted. Methodology 500 then returns to step 568, as described hereinabove and the next branch, if any, in the fetch group is processed.

Upon execution of a branch instruction, the target address is resolved, if the branch is a conditional branch. The actual target address upon resolution, may differ from the predicted address. As previously discussed, link stack recovery methodology 500 determines if a branch misprediction has occurred, in step 522. To recover the link stack in the event of a misprediction, methodology 500 performs steps 525–569.

In step 525, the values are read from the fields in the BIQ entry for the mispredicted branch and the corresponding values are used to set branch address register 94, predicted address field 86*a* in branch prediction register 86, the branch prediction, "taken" or "not-taken" as appropriate, in prediction field 86*b* in branch prediction register 86, active stack register 96, pointer register 61*a* and 61*b*, last stack operation register 82, current stack operation register 84, and change bit register 88. In an embodiment of the present invention, branch address register 94 may be set by branch address logic 85 and fields 86*a* and 86*b* in branch prediction register 86 may be set by branch prediction register logic 87, FIG. 3A. It is then determined, in step 527, if the value of curr_stack_op corresponds to a "push-type" operation, step 527. If so, it is determined, in step 529, if the actual outcome corresponds to a branch "taken". If the prediction is branch "taken", then in step 531, NIA register 92 is set by incrementing the branch address as previously described in conjunction with step 578, and the IFAR is set to the branch target address retrieved from the BIQ entry and set, in step 525, in the branch target field 86*a*.

It is then determined if the value of last_stack_op corresponds to a "pop-type" operation, step 533. If not, in step 535, the change bit register is reset. Otherwise, in step 535, the change bit register is set and the value of active_ stack in active stack register 96 is toggled, and step 537 is bypassed. In step 539, the active stack is determined. If the lower stack is active, in step 541, ptr0 is incremented and the value in NIA 92 and the value of change_bit in the change bit register is written to the entry in the link stack pointed to by ptr0. Methodology 500 then returns to step 568, previously described hereinabove. If, however, in step 539, the upper stack is active, then ptr1 is incremented in step 543 and the NIA and value of change_bit in the change bit register is written to the entry in the link stack pointed to by ptr1+8 in an embodiment of the present invention in which each logical stack includes eight entries as discussed above in conjunction with step 538. The incrementing of ptr0 or ptr1, depending on the active stack in step 541, may, in an embodiment of the present invention in accordance with the apparatus of FIG. 3A, be performed by the corresponding one of ptr0 control logic 89 and ptr1 control logic 91. Methodology 500 then returns to step 568.

Returning to step 529, if the predicted outcome determined in step 529 is "not taken", then in step 545, the active stack is determined. If the lower stack is active, the output register, for example, output register 59 in FIG. 3A, is updated with the corresponding values in the link stack entry pointed to by the value of ptr0, step 547. If, however, the upper stack is active in step 545, in step 549, the output register is updated with the values in the link stack entry pointed to by ptr1 incremented by eight in an embodiment of the present invention in which each logical stack includes eight entries. In an alternative embodiment in which each logical stack includes n entries, an artisan of ordinary skill would understand that the value of ptr1 is incremented by n in step 549. In step 551, the actual outcome is determined. If the actual outcome is branch "taken", then in step 553, the IFAR is set to the branch target address. Note that because methodology 500 has reached step 551 via the "No" branch of step 529 in this instance, and because a branch has mispredicted in step 522, the outcome in step 551 is necessarily branch "taken".

Returning now to step 527, if the current stack operation as represented by the value of curr_stack_op is not a "push-type" operation, it is then determined in step 555 if the current stack operation, represented by the value of curr_stack_op, is a "pop-type" operation. Recall that branch operations are implemented that do not result in a value being pushed onto the link stack, or being popped from the link stack. If the current stack operation is neither a push-type or a pop-type operation, then methodology 500 proceeds by the "No" branch of step 555 to step 545, and the output register is updated in accordance with steps 547 or 549, as previously described, depending on the active stack in step 545. However, now, in step 551, the outcome of the branch may either be "taken" or "not taken". If the outcome is "taken", the IFAR is set to the branch target address, in step 553. If, however, in step 551, the outcome is "not taken", then in step 557, the branch address is incremented by the instruction byte length, for example, four in an embodiment of the present invention, and the incremented address is set in the IFAR. Methodology 500 then returns to step 568.

If, however, in step 555, the current stack operation represented by the value of curr_stack_op is a "pop-type" operation, then in step 559, the outcome of the branch instruction is determined. If the branch is "not taken", then methodology 500 proceeds to step 545. Now, however, in step 551, because the outcome, as determined in step 559, is "not taken", step 551 necessarily proceeds by the "Yes" branch to step 557 to set the address in the IFAR. In an embodiment of the present invention in accordance with FIG. 3A, the branch address held in field 72 of the corresponding entry 57 in BIQ 56 may be provided to IFAR control logic 95 for setting IFAR 76.

If, however, the branch outcome is "taken" in step 559, in step 555 it is determined if the value of change_bit is set. If so, in step 563, the value of active-stack in the active stack register is toggled, and methodology 500 then continues with step 545, as previously described. Now, however, in step 551, because in step 559 it was determined the branch was taken, then step 551 necessarily proceeds by the "No" branch and the IFAR is set in accordance with step 553. In an embodiment of the present invention in accordance with FIG. 3A, the branch target address held in field 75a of the corresponding entry 57 in BIQ 56 may be provided to IFAR control logic 95 for setting IFAR 76.

However, in step 555, if the value of change_bit has not been set, the active stack is determined in step 565. If it is determined that the lower stack is active, then ptr0 is decremented, step 567. Recall that ptr0 and ptr1 may be modulo n pointers and thus, ptr0 is decremented modulo n in step 567. If, in step 565, the upper stack is active, ptr1 is decremented, modulo n, in step 569. In an embodiment of the present invention, n may be eight. After the corresponding pointer is decremented, in step 567 or step 569, methodology 500 continues with step 545 to update the output register, for example output register 59, FIG. 3A, and to set IFAR 76. However, because in step 559 it was determined that the branch was "taken", in step 551, the "No" branch is necessarily followed and the IFAR is set to the branch target address, step 553. Methodology 500 then returns to step 568 to process the next branch in the fetch group, if any.

If a flush event occurs, as discussed hereinabove in conjunction with step 520, methodology 500 recovers the link stack by executing steps 571–581. In step 571, the values are read from the fields in the BIQ entry corresponding to the last branch in program order prior to the instruction generating the flush event. The corresponding values from the BIQ entry are set in the active stack register, ptr0, ptr1, last stack operation register, and change bit register, for example, active stack register 96, ptr0 register 61a, ptr1 register 61b, last stack operation register 82, and change bit register 88 in an embodiment of the present invention in accordance with FIG. 3A. The active stack is then determined in step 573. If the active stack is the lower stack, then in step 575, the entry pointed to by ptr0 is read, step 575. Conversely, if the upper stack is active in step 573, then the stack entry corresponding to ptr1 incremented by n, which may be eight in an embodiment of the present invention, is read in step 577. The values in the link stack entry read in steps 575 or 577, depending on the active stack in step 573 are stored in the output register, for example, the return address is stored in field 59a of output register 59, and the change_bit value in field 59b of output register 59 in an embodiment of the present invention in accordance with FIG. 3B, in step 579. In step 581, the IFAR is set to the address of the flushed instruction, and methodology 500 returns to step 568 to continue processing additional branches in the current fetch group, if any.

Although the present invention and its advantages have been described in detail, it should be understood that various changes, substitutions and alterations can be made herein without departing from the spirit and scope of the invention as defined by the appended claims.

What is claimed is:

1. A memory device access method comprising the steps of:

fetching a plurality of instructions from said memory device;

determining a type of each branch instruction in said plurality of instructions;

for "push" type branch instructions predicted taken, performing the substeps of:

determining a type of a last operation on a stack, said stack having a first portion and a second portion, each stack portion including a plurality of entries for storing a return address in a selected entry of a selected one of said first stack portion and said second stack portion;

determining a next instruction address and storing said next instruction address in a selected entry of a selected one of said first and second stack portions, said entry selected in response to said step of determining said last operation type, and wherein said next instruction address is stored in a first portion of said selected entry; and setting a next fetch address to a target address of a first one of said branch instructions, said next fetch address for accessing said memory device; and for "pop" type branch instructions predicted taken, setting said next fetch address to a return address in a first entry in an active one of said first and second portions of said stack.

2. The method of claim 1 further comprising the step of, for a branch instruction predicted not taken, setting said next fetch address to a next sequential address.

3. The method of claim 1 further comprising the step of, for a branch instruction predicted not taken, discarding one or more subsequent instructions.

4. The method of claim 1 wherein, for "pop" type operations, said active one of said first and second stack portions is changed in response to a change value having a first predetermined value and is unchanged in response to said change value having a second predetermined value.

5. The method of claim 4 further comprising the step of, for "push" type branch instructions, storing said change value in a second portion of said selected entry in said selected one of said first and second stack portions, wherein a stored change value is operable for changing said active stack from a first one of said first and second stack portions to a second one of said first and second stack portions for a "pop" type operation.

6. The method of claim 4 further comprising the steps of:
allocating an entry in a queue for each branch in said plurality of instructions; and
for "push" type branch instructions, storing said change value in a first portion of a corresponding entry of said queue; and
for "pop" type branch instructions, storing said second predetermined value of said change value in said first position of said corresponding entry of said queue.

7. The method of claim 6 further comprising the steps of:
for "push" type branch instructions, storing said target address in a second portion of said corresponding entry in said queue; and
for a "pop" type operation, storing said next fetch address in said second portion of said corresponding entry, wherein a value in said second portion is operable for accessing said memory if a corresponding branch instruction is mispredicted.

8. A memory device access method comprising the steps of:
(a) fetching a plurality of instructions from said memory device;
(b) determining a type of each branch instruction in said plurality of instructions;
obtaining branch predictions for each branch instruction in said plurality of instructions;
(c) for each branch preceding a first one of a branch predicted taken and an unconditional branch, storing a plurality of branch information values in a corresponding entry in a queue;
(d) for a mispredicted branch, reading said plurality of branch information values in a corresponding queue entry;
(e) determining a next instruction address (NIA) in response to an address comprising a first portion of said plurality of branch information values read in step (d) and storing said NIA in an entry in a selected one of first and second logical stacks, said selected one of said first and second logical stacks selected in response to a second portion of said plurality of branch information values read in step (d).

9. The method of claim 8 wherein said second portion of said plurality of branch information values comprises an active stack value.

10. The method of claim 8 further comprising the steps of, in response to a flush request:
reading said plurality of branch information values in a queue entry corresponding to a last branch instruction prior to a flushed instruction corresponding to said flush request; and
setting a next fetch address to an address of said flushed instruction.

11. The method of claim 10 wherein said address of said flushed instruction is read from an entry in a selected one of said first and second logical stacks pointed to by a pointer value comprising a respective one of a second portion and third portion of said plurality of branch information values, said selected one of said first and second logical stacks selected in response to a value comprising a fourth portion of said plurality of branch information values.

12. The method of claim 8 further comprising the steps of, for a mispredicted branch:
if said mispredicted branch is taken, setting a next fetch address to a target address of said mispredicted branch; and
if said mispredicted branch is not taken, setting said next fetch address to an incremented address comprising an address of said mispredicted branch incremented by a predetermined increment.

13. A memory device access apparatus comprising:
a register operable for storing an instruction address for accessing said memory device;
a stack having first and second stack portions, each portion including a plurality of entries, wherein each entry is operable for storing a first address operable for accessing said memory device;
first stack logic operable for determining a last stack operation type; and
second stack logic operable for determining a current stack operation type, wherein said current and last stack operation types correspond to a current operation on said stack and an immediately previous operation on said stack, and wherein an address of a next instruction is set in a selected one of said register and a selected entry in a selected one of said first and second stack portions in response to a type of a branch instruction, a prediction of said branch instruction and a type of said last stack operation.

14. The apparatus of claim 13 wherein a type of said current and last stack operations is selected from the group consisting of "push" type operations and "pop" type operations.

15. The apparatus of claim 13 further comprising a queue including a plurality of entries, each entry having one or more fields for holding a corresponding one of a set of branch information values for said branch instruction, and wherein said first and second stack logic determine said last and current stack operations, respectively, in response to a selected set of said plurality of branch information values.

16. The apparatus of claim 15 wherein said branch information values are operable for determining an instruction address in response to a branch misprediction.

17. The apparatus of claim 15 wherein said branch information values are operable for determining an instruction address in response to a flush request.

18. The apparatus of claim 15 further comprising stack control logic operable for selecting an active one of said first and second stack portions in response to a preselected one of said plurality of branch information values, a preselected entry in said active one of said first and second stack portions containing an address operable for setting in said register.

19. The apparatus of claim 18 wherein said preselected entry is selected in response to a second one of said plurality of branch information values.

20. The apparatus of claim 18 further comprising a third stack logic for setting a data value operable for changing said active stack from a first one of said first and second stack portions to a second one of said first and second stack portions, and wherein said plurality of branch information values includes said data value.

* * * * *